(12) United States Patent
Liang et al.

(10) Patent No.: US 9,138,721 B2
(45) Date of Patent: Sep. 22, 2015

(54) ZWITTERIONIC STATIONARY PHASE FOR HYDROPHILIC INTERACTION LIQUID CHROMATOGRAPHY AND PREPARATION METHOD THEREOF

(75) Inventors: Xinmiao Liang, Dalian (CN); Aijin Shen, Dalian (CN); Zhimou Guo, Dalian (CN); Long Yu, Dalian (CN); Liwei Cao, Dalian (CN)

(73) Assignee: DALIAN INSTITUTE OF CHEMICAL PHYSICS, CHINESE ACADEMY OF SCIENCES, Dalian, Liaoning (CN)

( * ) Notice: Subject to any disclaimer, the term of this patent is extended or adjusted under 35 U.S.C. 154(b) by 177 days.

(21) Appl. No.: 13/882,504

(22) PCT Filed: Nov. 25, 2011

(86) PCT No.: PCT/CN2011/082965
§ 371 (c)(1),
(2), (4) Date: Apr. 29, 2013

(87) PCT Pub. No.: WO2012/100592
PCT Pub. Date: Aug. 2, 2012

(65) Prior Publication Data
US 2013/0324700 A1    Dec. 5, 2013

(30) Foreign Application Priority Data

Jan. 28, 2011    (CN) .......................... 2011 1 0030643

(51) Int. Cl.
| | |
|---|---|
| *C07F 7/10* | (2006.01) |
| *B01J 20/286* | (2006.01) |
| *B01J 20/288* | (2006.01) |
| *B01J 20/30* | (2006.01) |
| *B01J 20/32* | (2006.01) |
| *B01J 20/10* | (2006.01) |
| *B01D 15/30* | (2006.01) |
| *B01D 15/36* | (2006.01) |

(52) U.S. Cl.
CPC ............ *B01J 20/286* (2013.01); *B01D 15/305* (2013.01); *B01D 15/364* (2013.01); *B01J 20/103* (2013.01); *B01J 20/288* (2013.01); *B01J 20/3085* (2013.01); *B01J 20/3204* (2013.01); *B01J 20/3242* (2013.01); *B01J 20/3278* (2013.01)

(58) Field of Classification Search
CPC .... C07D 7/1836; B01D 15/305; B01J 20/286
USPC ........................................................ 556/418
See application file for complete search history.

(56) References Cited

U.S. PATENT DOCUMENTS 7,238,426 B2    7/2007    Jiang et al.

2005/0064192 A1    3/2005    Jiang et al.
2008/0293959 A1    11/2008    Liu et al.
2010/0300971 A1*    12/2010    Jiang et al. .................... 210/656

FOREIGN PATENT DOCUMENTS

| CN | 101411973 A | 4/2009 |
|---|---|---|
| EP | 1137466 B1 | 8/2006 |

OTHER PUBLICATIONS

Aijin Shen, et al. "A novel zwitterionic HILIC stationary phase based on "thiol-ene" click chemistry between cysteine and vinyl silica." Chem. Commun. Mar. 14, 2011, vol. 47, pp. 4550-4552.
Zhimou Guo et al., "Click chemistry: a new facile and efficient strategy for preparation of functionalized HPLC packings." Chemical Communications, 2006, pp. 4512-4514.
Hartmuth C. Kolb, et al. "Click Chemistry: Diverse Chemical Function from a Few Good Reactions." Angewandte Chemie International Edition, 2001, pp. 2004-2021.
Zhimou Guo, et al. ""Click saccharides": novel separation materials for hydrophilic interaction liquid chromatography." Chemical Communications, 2007, pp. 2491-2493.
Wen Jiang, et al., "Covalently Bonded Polymeric Zwitterionic Stationary Phase for Simultaneous Separation of Inorganic Cations and Anions." Anal. Chem., 1999, pp. 333-344.
Mary J. Wirth, at el., "Horizontal Polymerization of Mixed Trifunctional Silanes on Silica. 2. Application to Chromatographic Silica Gel." Anal. Chem., 1993, pp. 822-826.
Mary J. Wirth, at el., "Horizontal Polymerization of Mixed Trifunctional Silanes on Silica: A Potential Chromatographic Stationary Phase." Anal. Chem., 1992, pp. 2783-2786.
Petrus Hemstrom, et al., "Hydrophilic interaction chromatography." J. Sep. Sci., 2006, pp. 1784-1821.
Andrew J. Alpert, "Hydrophilic-interaction chromatography for the separation of peptides, nucleic acids and other polar compounds." Journal of Chromatography A, 1990, pp. 177-196.
Michael Lammerhofer, et al., "Quinine and quinidine derivatives as chiral selectors I. Brush type chiral stationary phases for high-performance liquid chromatography based on cinchonan carbamates and their application as chiral anion exchangers." Journal of Chromatography A, 1996, pp. 33-48.
Tohru Ikegami, et al., "Separation efficiencies in hydrophilic interaction chromatography." Journal of Chromatography A, 2008, pp. 474-503.
Wen Jiang, et al., "Tentacle-Type Zwitterionic Stationary Phase Prepared by Surface-Initiated Graft Polymerization of 3-[N,N-Dimethyl-N-(Methacryloyloxyethyl)-ammonium]

(Continued)

*Primary Examiner* — Clinton Brooks
*Assistant Examiner* — Kofi Adzamli
(74) *Attorney, Agent, or Firm* — Novick, Kim & Lee, PLLC; Allen Xue

(57) ABSTRACT

A type of liquid chromatographic stationary phase and preparation method thereof, the bonding terminal of the chromatographic stationary phase is zwitterionic functional group. The preparation method includes the following steps, alkenyl or alkynyl silane is bonded onto the surface of silica based on the horizontal polymerization approach to obtain alkenyl- or alkynyl-modified silica. Then the thiol click reaction with zwitterionic compound containing thiol group is performed to obtain the zwitterionic hydrophilic interaction chromatographic stationary phase. The present stationary phase possesses both zwitterionic characteristics and excellent hydrophilicity. It can be widely applied in the separation of variety of samples.

9 Claims, 2 Drawing Sheets

(56) References Cited

OTHER PUBLICATIONS

Propanesulfonate through Peroxide Groups Tethered on Porous Silica." Anal. Chem., 2002, pp. 4682-4687.

Richard Hoogenboom, "Thiol—Yne Chemistry: A Powerful Tool for Creating Highly Functional Materials." Angew. Chem. Int. Ed., 2010, pp. 3415-3417.

Andrew B. Lowe, et al., "Thiol-yne click chemistry: A powerful and versatile methodology for materials synthesis." J. Mater. Chem., 2010, pp. 4745-4750.

Charles E. Hoyle, et al., "Thiol—Ene Click Chemistry." Angew. Chem. Int. Ed. 49, 2010, pp. 1540-1573.

Wen Jiang, et al., "Zwitterionic stationary phase with covalently bonded phosphorylcholine type polymer grafts and its applicability to separation of peptides in the hydrophilic interaction liquid chromatography mode." Journal of Chromatography A, 2006, pp. 82-91.

\* cited by examiner

ZWITTERIONIC STATIONARY PHASE FOR HYDROPHILIC INTERACTION LIQUID CHROMATOGRAPHY AND PREPARATION METHOD THEREOF

FIELD OF THE INVENTION

The present invention relates to a novel high performance liquid chromatographic stationary phase and its preparation. More particularly, the present invention relates to a novel hydrophilic interaction chromatographic stationary phase with zwitterionic functional groups at the end of the bonded phase.

BACKGROUND OF THE INVENTION

Hydrophilic interaction liquid chromatography (HILIC) has been developed as an chromatographic technique in separating highly polar compounds for the past few years [Alpert, A. J. J. Chromatogr. 1990, 499, 177-196; Strege, M. A. Anal. Chem. 1998, 70, 2439-2445; Strege, M. A. et al, Anal. Chem. 2000, 72, 4629-4633; Wang, X. D. et al, J. Chromatogr. A, 2005, 1083, 58-62]. The research of HILIC stationary phases is the basis for the development and application of HILIC. The conventional chromatographic stationary phases for normal phase liquid chromatography (NPLC), such as unmodified silica column, amino-based column, cyano-based column et al., can be directly used in HILIC [Guo, Y. et al, J. Chromatogr. A, 2005, 1074, 71-80; Garbis, S. D. et al, Anal. Chem. 2001, 73, 5358-5364]. However, the reproducibility is always poor and the service life of the columns is short. In recent years, novel polar stationary phases dedicated for HILIC such as amide-, hydroxyl- and zwitterionic functional group-modified stationary phase et al. have been successfully developed [Guo, Y. et al, J. Chromatogr. A, 2005, 1074, 71-80; Irgum, K. et al, J. Sep. Sci., 2006, 29, 1784-1821; Jandera, P., J. Sep. Sci., 2008, 31, 1421-1431]. The development of novel chromatographic stationary phases is of great significance for the research and application of HILIC.

The radical click reaction between thiol-ene and thiol-yne catalyzed by radical initiators has been widely used in the synthesis and modification of small molecules and polymers [Bowman, C. N. et al, Chem. Soc. Rev, 2010, 39, 1355-1387]. The click reaction possesses the characteristics of simplicity, high selectivity and high efficiency et al., thus it is very suitable for the preparation of chromatographic stationary phases.

Zwitterionic compounds which have high polarity and good hydrophilicity are well suited for hydrophilic interaction chromatographic stationary phase. The distribution of the oppositely charged groups on conventional zwitterionic HILIC stationary phases is perpendicular to the solid matrix and the surface charge of the stationary phase is difficult to adjust [W. Jiang et al, J. Chromatogr. A, 2006, 1127, 82-91]. The distribution of positive and negative charges is paralleled to the surface of the solid matrix on zwitterionic HILIC stationary phase prepared from compound with zwitterionic functional group at the end of it. And its surface charge can be adjusted and optimized by changing the pH values. However, no article involves such zwitterionic HILIC stationary phase has been reported and no product exists.

SUMMARY OF THE INVENTION

The objective of this invention is to provide a type of novel high performance liquid chromatographic stationary phase and its preparation method. The present stationary phase is a type of novel HILIC stationary phase with zwitterionic functional groups at the end of the bonded phase. The preparation method of the stationary phase is simple and it has a wide range of applications.

The technical scheme of this invention: high performance liquid chromatographic stationary phase which is characterized in the structure:

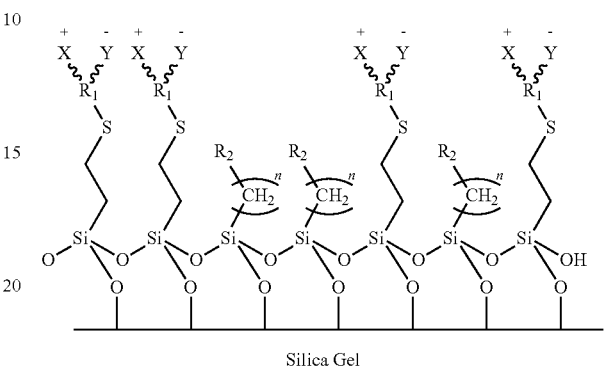

Silica Gel

Wherein $SiO_2$ is silica,

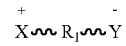

is one of amino acid, peptide or protein. And n is 0~4, $R_2$ is vinyl or acetenyl group, $X^+$ represents positively charged amino group, $Y^-$ represents negatively charged carboxyl group.

The present invention also provides the preparation method for the stationary phase as described above, which is characterized in the following steps:

a. Pretreatment of silica: the addition of hydrochloric acid or nitric acid aqueous solution with the concentration of 1~38 wt % into silica gel, and the solution is heated to reflux while stirring for 1~48 hours. The resulted material is filtered, washed with water until neutral and dried to constant weight under 100~160° C. After that, the dried silica gel is placed in nitrogen or argon atmosphere with the humidity of 20~80% for 24~72 hours until the weight increment is 0.5~10 wt % to obtain the humidified silica.

b. Polymerization on silica surface: the humidified silica obtained from step a is first placed in reaction vessel made of glass or polytetrafluoroethylene and organic solvent is added under nitrogen atmosphere. The solution is stirred and mixed well, and then alkenyl or alkynyl silane is dropwise added. The reaction is performed under 20~200° C. for 2~48 hours with continuous stirring. After that, the reaction is cooled to room temperature. The reaction product is filtered and washed by toluene, dichloromethane, methanol, water, tetrahydrofuran and methanol successively. The solid product is dried under 60~100° C. for 12~24 hours to obtain alkenyl- or alkynyl-modified silica.

The organic solvent used as described above is water-immiscible, which is a kind of benzene series or alkane, such as toluene, ethylbenzene, dimethylbenzene, n-hexane, n-heptane, n-pentane, n-octane, or cyclohexane et al. The amount of usage is 2~100 mL of organic solvent per gram humidified silica.

The structures of the used alkenyl or alkynyl silane are as follows,

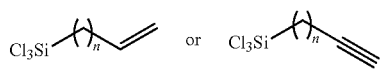

wherein n is 0~4. The amount of usage is 0.5~5 mmol of alkenyl or alkynyl silane per gram humidified silica.

c. Thiol click reaction: zwitterionic compound containing thiol group is first placed in reaction vessel made of glass or polytetrafluoroethylene. Water and polar organic solvent is added under nitrogen atmosphere. The mixture is stirred to complete dissolution. Then 2,2'-azodiisobutyronitrile or 2,2'-azobis(2,4-dimethylvaleronitrile) is added into the solution, and then alkenyl- or alkynyl-modified silica obtained from step b is added. The reaction is performed under 20~200° C. for 2~48 hours with continuous stirring. After that, the reaction is cooled to room temperature. The reaction product is filtered and washed with methanol, water and methanol in succession. The solid product is dried under 60~100° C. for 12 hours to obtain the zwitterionic hydrophilic interaction chromatographic stationary phase.

The polar organic solvent used as described above is one of methanol, ethanol, dimethylsulfoxide, tetrahydrofuran, acetone, or N,N'-dimethyl formamide. The volume ratio of polar organic solvent and water is 1:10~10:1. The amount of usage is 1~100 mL of solvent mixture per gram alkenyl- or alkynyl-modified silica. The zwitterionic compound containing thiol group utilized above is cysteine, peptide containing thiol group or zwitterionic compound connected with alkyl chain. The amount of usage is 1~100 mmol of zwitterionic compound containing thiol group per gram alkenyl- or alkynyl-based silica. The amount of usage of 2,2'-azodiisobutyronitrile or 2,2'-azobis(2,4-dimethylvaleronitrile) is 0.01~1 mmol per gram alkenyl- or alkynyl-based silica.

Advantages of the Invention are Summarized Below:

1. Novel structures. The end of the stationary phase is zwitterionic functional groups. Besides, the distribution of positive and negative charges is paralleled to the surface of the solid matrix.

2. Adjustable surface charges. The positive or negative charges on the surface of the zwitterionic bonded phase provided by the present invention can be adjusted by changing the pH values, realizing the control and optimization of the ion exchange characteristics and ion exchange capacity.

3. Wide range of applications. The zwitterionic stationary phase provided by the present invention is a type of versatile HILIC stationary phase. It displays excellent separation selectivity for most of the polar and ionic compounds and is widely applicable to the separation of a variety of samples.

4. The preparation procedure is simple and reliable, making it suitable for commercialization.

DETAILED DESCRIPTION OF THE EMBODIMENTS

Figure 1:
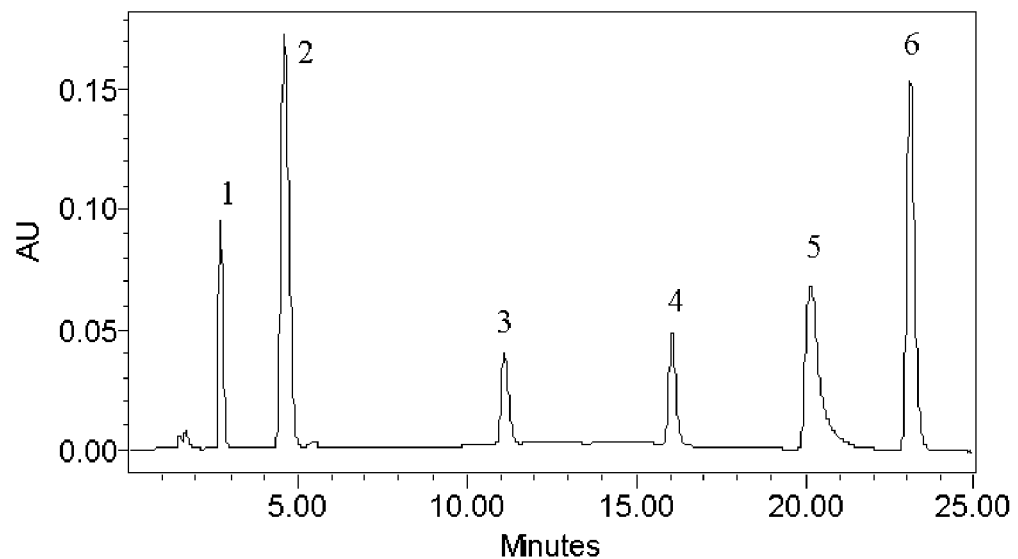
FIG. 1 is the chromatogram for the separation of peptides by the stationary phase synthesized in Example 1.

In the following, further explanation is given for the present invention by the incorporation of specific examples.

The examples are presented for the illustration of the present invention, rather than limiting the scope of the invention.

Example 1

10 g of spherical silica (5 μm particle size, 10 nm pore size, 305 $m^2 g^{-1}$ specific surface areas) was weighed out and placed in a glass flask of 250 mL. 150 mL of hydrochloric acid aqueous solution with the volumetric concentration of 10% was added into the flask. The solution was heated to reflux for 12 hours and cooled to room temperature. The resulting material was filtered, washed with water until neutral and dried at 150° C. for 24 hours. The dried silica gel was placed in a three-necked glass bottle of 150 mL. After continuously flowing nitrogen of 50% relative humidity into the bottle for 48 hours, 10.5 g of humidified silica was obtained. After that, 80 mL of dried n-hexane was added into the humidified silica under dried nitrogen atmosphere. The solution was stirred and mixed well, and then 3.9 mL of trichlorovinylsilane was dropwise added. The reaction was carried out at room temperature for 24 hours while stirring. The reaction product was filtered, washed with toluene, dichloromethane, methanol, water, tetrahydrofuran and methanol successively and dried at 80° C. for 12 hours to obtain the vinyl-modified silica. Finally, 10.9 g of cysteine was placed in a glass flask of 250 mL, 100 mL of water and 50 mL of methanol were added. The mixture was stirred until complete dissolution. 200 mg of 2,2'-azodiisobutyronitrile was added into the solution, and then 10 g of vinyl-modified silica was added. The reaction was performed at 65° C. for 48 hours with continuous stirring and cooled to room temperature. The material was filtered and washed with water and methanol. Then the solid product was dried at 80° C. for 12 hours to obtain the resulting zwitterionic HILIC stationary phase I.

Example 2

10 g of spherical silica (5 μm particle size, 10 nm pore size, 305 $m^2 g^{-1}$ specific surface areas was weighed out and placed in a glass flask of 250 mL. 120 mL of nitric acid aqueous solution with the volumetric concentration of 20% was added into the flask. The solution was heated to reflux for 12 hours and cooled to room temperature. The resulting material was filtered, washed with water until neutral and dried at 150° C. for 12 hours. The dried silica gel was placed in a three-necked glass bottle of 150 mL. After continuously flowing nitrogen of 70% relative humidity into the bottle for 48 hours, 10.6 g of humidified silica was obtained. After that, 50 mL of dried toluene was added into the humidified silica under dried nitrogen atmosphere. The solution was stirred and mixed well, and then 5.2 mL of trichlorovinylsilane was dropwise added. The reaction was carried out at 50° C. for 24 hours while stirring. The reaction product was filtered, washed with toluene, dichloromethane, methanol, water, tetrahydrofuran and methanol successively and dried at 60° C. for 12 hours to obtain the vinyl-modified silica. Finally, 3.6 g of cysteine was placed in a glass flask of 250 mL, 100 mL of water and 80 mL of N,N'-dimethyl formamide were added. The mixture was stirred until complete dissolution. 160 mg of 2,2'-azodiisobutyronitrile was added into the solution, and then 10 g of vinyl-modified silica was added. The reaction was performed at 80° C. for 24 hours with continuous stirring and cooled to room temperature. The material was filtered and washed with water and methanol. Then the solid product was dried at 70° C. for 12 hours to obtain the resulting zwitterionic HILIC stationary phase II.

Example 3

It was similar to Example 1 except the utilization of glutathione instead of cysteine.

Example 4

It was similar to Example 1 except the utilization of human serum albumin (HSA) instead of cysteine.

Example 5

It was similar to Example 1 except the utilization of trichloropropargylsilane instead of trichlorovinylsilane.

Example 6

10 g of spherical silica (5 μm particle size, 20 nm pore size, 150 m² g⁻¹ specific surface areas) was weighed out and placed in a glass flask of 150 mL. 80 mL of hydrochloric acid aqueous solution with the volumetric concentration of 10% was added into the flask. The solution was heated to reflux for 8 hours and cooled to room temperature. The resulting material was filtered, washed with water until neutral and dried at 150° C. for 12 hours. The dried silica gel was placed in a three-necked glass bottle of 150 mL. After continuously flowing nitrogen of 80% relative humidity into the bottle for 48 hours, 10.6 g of humidified silica was obtained. After that, 80 mL of dried n-heptane was added into the humidified silica under dried nitrogen atmosphere. The solution was stirred and mixed well, and then 1.9 mL of trichlorovinylsilane was dropwise added. The reaction was carried out at room temperature for 12 hours while stirring. The reaction product was filtered, washed with toluene, dichloromethane, methanol, water, tetrahydrofuran and methanol successively and dried at 80° C. for 12 hours to obtain the vinyl-modified silica. Finally, 5.5 g of cysteine was placed in a glass flask of 250 mL, 100 mL of water and 100 mL of methanol were added. The mixture was stirred until complete dissolution. 100 mg of 2,2'-azodiisobutyronitrile was added into the solution, and then 10 g of vinyl-modified silica was added. The reaction was performed at 70° C. for 48 hours with continuous stirring and cooled to room temperature. The material was filtered and washed with water and methanol. Then the solid product was dried at 80° C. for 12 hours to obtain the resulting zwitterionic HILIC stationary phase III.

Example 7

The zwitterionic HILIC stationary phase I as described in Example 1 was packed into a chromatographic column (150 mm×4.6 mm I.D.) and applied in the separation of peptides. As shown in FIG. 1, (1) Leu-Gly-Gly, (2) Phe-Gly-Gly-Phe, (3) Gly-Gly-His, (4) Lys-Gly, (5) Glu-Glu, (6) Arg-Val-Tyr-Ile-His-Pro-Phe. All the six peptides were well isolated. Chromatographic conditions as follows,
Column: 150 mm×4.6 mm I.D.
Mobile phase: A, 20 mM monopotassium phosphate (KH₂PO₄), pH 3.37; B, acetonitrile (ACN)
Gradient: 0-5 min 25% A, 5-20 min 25%-50% A, 20-25 min 50% A
Flow rate: 1.0 mL/min
Column temperature: 30° C.
Detection wavelength: 220 nm

Example 8

Figure 2:
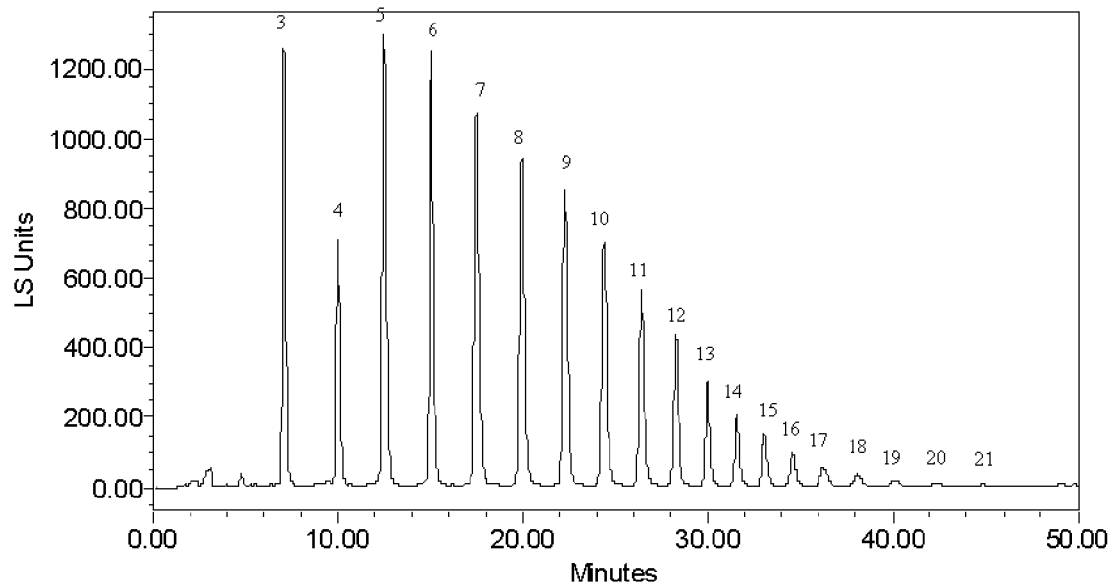
FIG. 2 is the chromatogram for the separation of fructooligosaccharides by the stationary phase synthesized in Example 1.

The zwitterionic HILIC stationary phase I as described in Example 1 was packed into a chromatographic column (150 mm×4.6 mm I.D.) and applied in the separation of fructooligosaccharides. As shown in FIG. 2, oligosaccharides of different degree of polymerization (DP) are efficiently separated from each other. Chromatographic conditions as follows,
Column: 150 mm×4.6 mm I.D.
Mobile phase: A, water; B, ACN
Gradient: 0-30 min 30%-50% A, 30-45 min 50% A, 45-50 min 50%-70% A
Flow rate: 1.0 mL/min
Column temperature: 30° C.
Detector: ELS detector

Example 9

Figure 3:
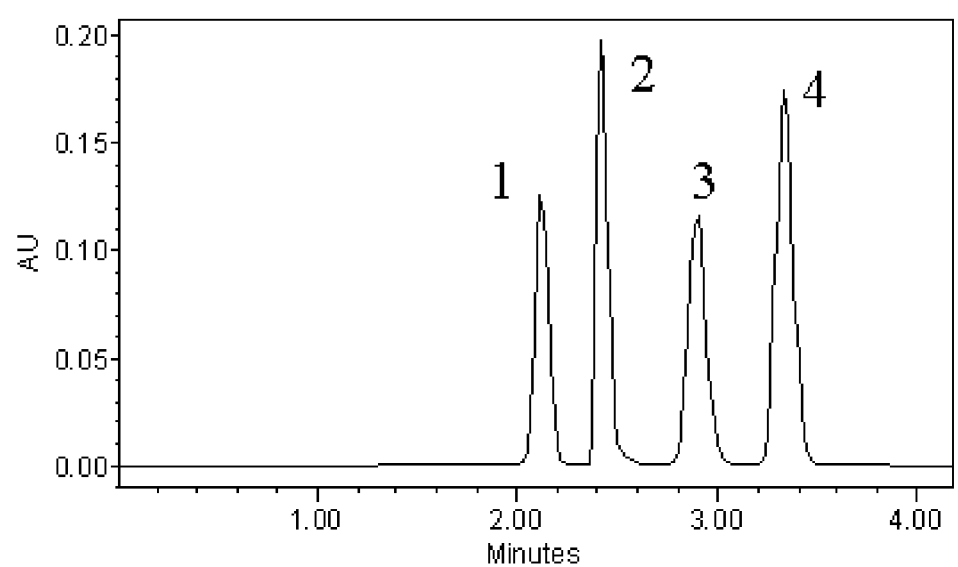
FIG. 3 is the chromatogram for the separation of alkaloids by the stationary phase synthesized in Example 1.

The zwitterionic HILIC stationary phase I as described in Example 1 was packed into a chromatographic column (150 mm×4.6 mm I.D.) and applied in the separation of alkaloids. As shown in FIG. 3, (1) berberine, (2), amitriptyline, (3), desipramine, (4), propranolol. All the four alkaloids are well separated from each other. Chromatographic conditions as follows,
Column: 150 mm×4.6 mm I.D.
Mobile phase: 10% ammonium formate (100 mM, pH 3.28), 90% ACN
Flow rate: 1.0 mL/min
Column temperature: 30° C.
Detection wavelength: 265 nm

We claim:

1. A zwitterionic hydrophilic interaction chromatographic stationary phase, comprising:
   a silica substrate;
   a bonded phase affixed to the silica substrate, wherein the bonded phase comprises zwitterionic functional groups

and
   —(CH₂)n-R₂ groups affixed to the silica substrate;
   wherein

is an amino acid, a peptide, or a protein, X⁺ represents a positively charged amino group, Y⁻ represents a negatively charged carboxyl group,
   wherein R₂ is a vinyl group or an acetenyl group, n is 0 to 4,
   wherein the stationary phase is schematically represented as follows:

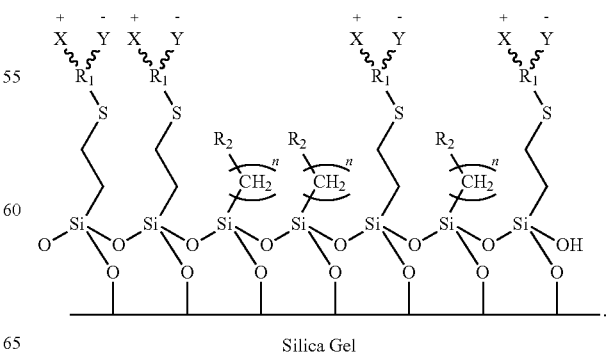

Silica Gel

2. A preparation method for the stationary phase of claim 1, comprising:

a. pretreating a silica, which comprises:

acid-treating the silica in a hydrochloric or nitric acid solution;

humidifying the acid-treated silica in nitrogen or argon with a humidity of 20-80% for 24-74 hrs to obtain a humidified silica;

b. reacting the humidified silica with an alkenyl or alkynyl silane to obtain an alkenyl- or alkynyl-modified silica;

c. reacting a zwitterionic compound comprising a thiol group, 2,2'-azodiisobutyronitrile or 2,2'-azobis(2,4-dimethylvaleronitrile), and the alkenyl- or alkynyl-modified silica in a solution.

3. The preparation method of claim 2, wherein, in step b, the reaction between the humidified silica and the alkenyl or alkynyl silane is carried out in a water immiscible organic solvent.

4. The preparation method of claim 3, wherein the organic solvent is chosen from toluene, ethylbenzene, dimethylbenzene, n-hexane, n-heptane, n-pentane, n-octane, or cyclohexane.

5. The preparation method of claim 2, wherein the alkenyl silane is

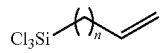

and the alkynyl silane is

wherein n is 0 to 4.

6. The preparation method of claim 2, wherein the solution in step c comprises water and a polar organic solvent chosen from methanol, ethanol, dimethylsulfoxide, tetrahydrofuran, acetone, or N,N'-dimethyl formamide, wherein a volumetric ratio of the polar organic solvent and water is 1:10 to 10:1.

7. The preparation method of claim 2, wherein the zwitterionic compound is chosen from cysteine, glutathione, peptide containing thiol group, or protein containing thiol group.

8. The preparation method of claim 2, wherein, in step c, 0.01 to 1 mmol of 2,2'-azodiisobutyronitrile or 2,2'-azobis(2,4-dimethylvaleronitrile) is used per gram of the alkenyl- or alkynyl-modified silica.

9. The preparation method of claim 7, wherein 1 to 100 mmol of zwitterionic compound is used per gram of the alkenyl- or alkynyl-modified silica.

\* \* \* \* \*